(12) United States Patent
Yim et al.

(10) Patent No.: US 7,805,582 B2
(45) Date of Patent: Sep. 28, 2010

(54) METHOD OF MANAGING MEMORY IN MULTIPROCESSOR SYSTEM ON CHIP

(75) Inventors: Keun Soo Yim, Yongin-si (KR);
Jeong-joon Yoo, Yongin-si (KR);
Young-sam Shin, Yongin-si (KR);
Seung-won Lee, Hwaseong-si (KR);
Han-cheol Kim, Yongin-si (KR);
Jae-don Lee, Paju-si (KR); Min-kyu Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 476 days.

(21) Appl. No.: 11/898,659

(22) Filed: Sep. 13, 2007

(65) Prior Publication Data

US 2008/0177941 A1 Jul. 24, 2008

(30) Foreign Application Priority Data

Jan. 19, 2007 (KR) .................... 10-2007-0006298

(51) Int. Cl.
*G06F 12/00* (2006.01)
*G06F 12/02* (2006.01)
*G06F 3/06* (2006.01)
*G06F 13/00* (2006.01)
*G06F 13/28* (2006.01)
*G06F 3/00* (2006.01)
*G06F 9/44* (2006.01)
*G06F 9/46* (2006.01)
*G06F 9/45* (2006.01)

(52) U.S. Cl. ................ 711/154; 711/105; 711/133; 711/147; 717/140; 719/332

(58) Field of Classification Search ........... 711/105, 711/133, 147, 154; 719/332; 717/140
See application file for complete search history.

(56) References Cited

U.S. PATENT DOCUMENTS

| 5,893,159 | A * | 4/1999 | Schneider ............... 711/150 |
| 7,185,324 | B2 * | 2/2007 | Michimoto et al. ......... 717/140 |
| 2005/0149665 | A1 * | 7/2005 | Wolrich et al. ............. 711/105 |
| 2006/0143415 | A1 * | 6/2006 | Naik ........................ 711/163 |

OTHER PUBLICATIONS

S. Udayakumaran et al. "Dynamic Allocation for Scratch-Pad Memory Using Compile-Time Decisions" ACM. Trans. Embedded Computing Systems, vol. 5, No. 2, May 2006; pp. 472-511.
O. Ozturk et al. "Shared Scratch-Pad Memory Space Management" IEEE ISQED, 2006, 6 pages.

* cited by examiner

*Primary Examiner*—Christian P Chace
*Assistant Examiner*—Ryan Bertram
(74) *Attorney, Agent, or Firm*—Staas & Halsey LLP (57) ABSTRACT

Provided is a method of managing memory in a multiprocessor system on chip (MPSoC). According to an aspect of the present invention, locality of memory can be reflected and restricted memory resources can be efficiently used by determining a storage location of a variable or a function which corresponds to a symbol with reference to a symbol table based on memory access frequency of the variable or the function, comparing the determined storage location and a previous storage location, and copying the variable or the function stored in the previous storage location to the determined storage location if the determined storage location is different from the previous storage location.

14 Claims, 7 Drawing Sheets

METHOD OF MANAGING MEMORY IN MULTIPROCESSOR SYSTEM ON CHIP

CROSS-REFERENCE TO RELATED APPLICATIONS

This application claims the benefit of Korean Patent Application No. 10-2007-0006298, filed on Jan. 19, 2007, in the Korean Intellectual Property Office, the disclosure of which is incorporated herein in its entirety by reference.

BACKGROUND

1. Field

One or more embodiments relate to a method of managing memory, and more particularly, to a method of managing memory in a multiprocessor system on chip (MPSoC)

2. Description of the Related Art

As higher performance of embedded systems is continuously demanded, integrating more and more processors onto a system on chip (SoC) is unavoidable.

A SoC is a chip that can integrally operate itself, that is, a chip including a system. While a computer includes all hardware components necessary for processing instruction code on a chip, a SoC may include the computer and all other necessary additional electronic parts. For example, a SoC used for communication may include a microprocessor, a digital signal processor (DSP), random access memory (RAM) and read only memory (ROM). In general, a SoC allows a system to be small and an assembling process to be simple. Accordingly, dual or quad processors, DSPs, RAM devices and ROM devices can be integrated onto a single chip.

Figure 1:
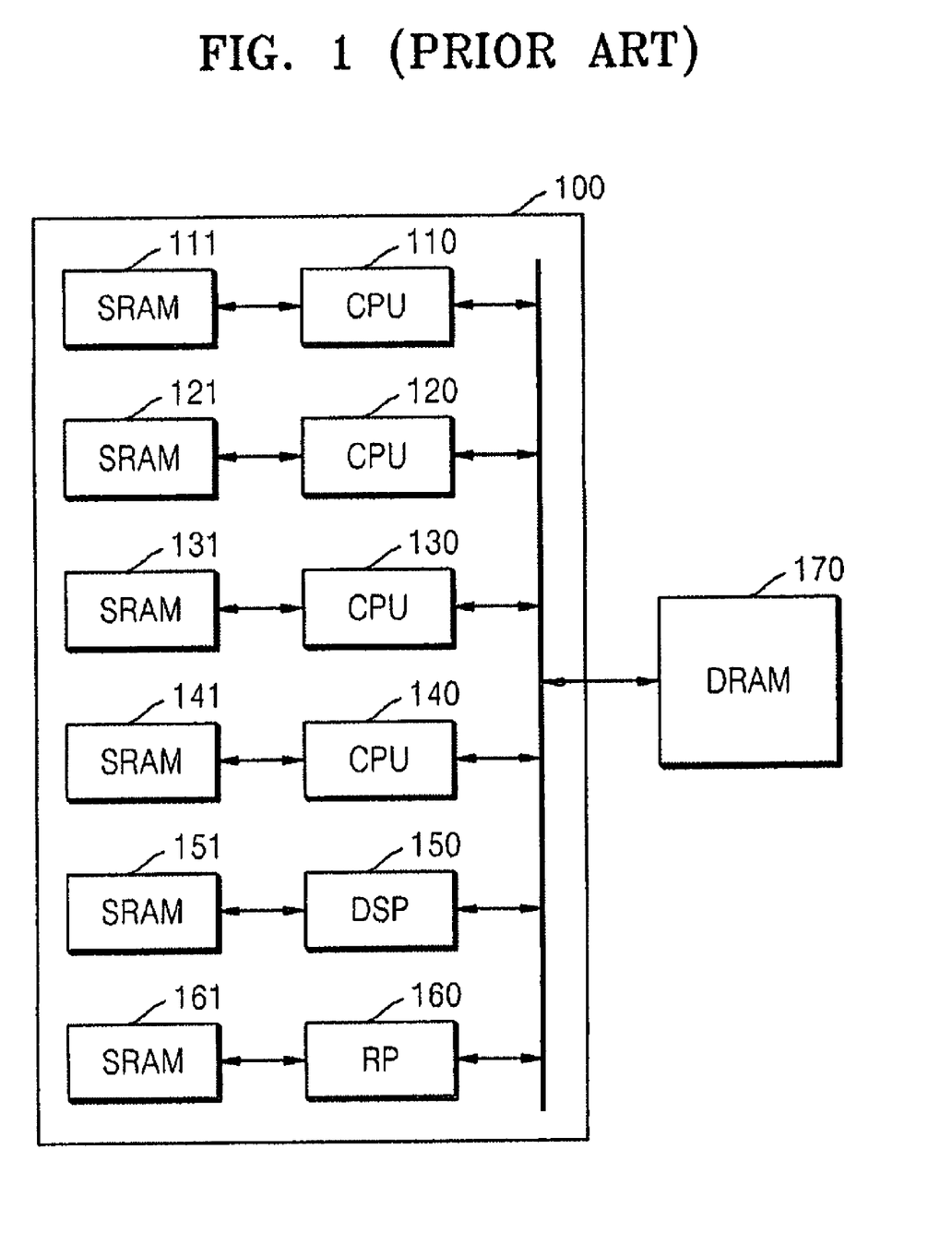
FIG. 1 is a block diagram illustrating a structure of a conventional multiprocessor system on chip (MPSoC)

FIG. 1 is a block diagram illustrating a structure of a conventional multiprocessor system on chip (MPSoC).

Referring to FIG. 1, the MPSoC includes a SoC 100 including four central processing units (CPUs) 110, 120, 130 and 140, a DSP 150, a reconfigurable processor (RP) 160 and a plurality of local static random access memories (SRAMs) 111, 121, 131, 141, 151 and 161 which respectively correspond to the CPUs 110, 120, 130 and 140, the DSP 150 and the RP 160, and a dynamic random access memory (DRAM) 170.

In the MPSoC, access from the local SRAMs 111, 121, 131, 141, 151 and 161 to the DRAM 170, which is the main memory, is a key solving problems such as time delay and power consumption.

Figure 2A:
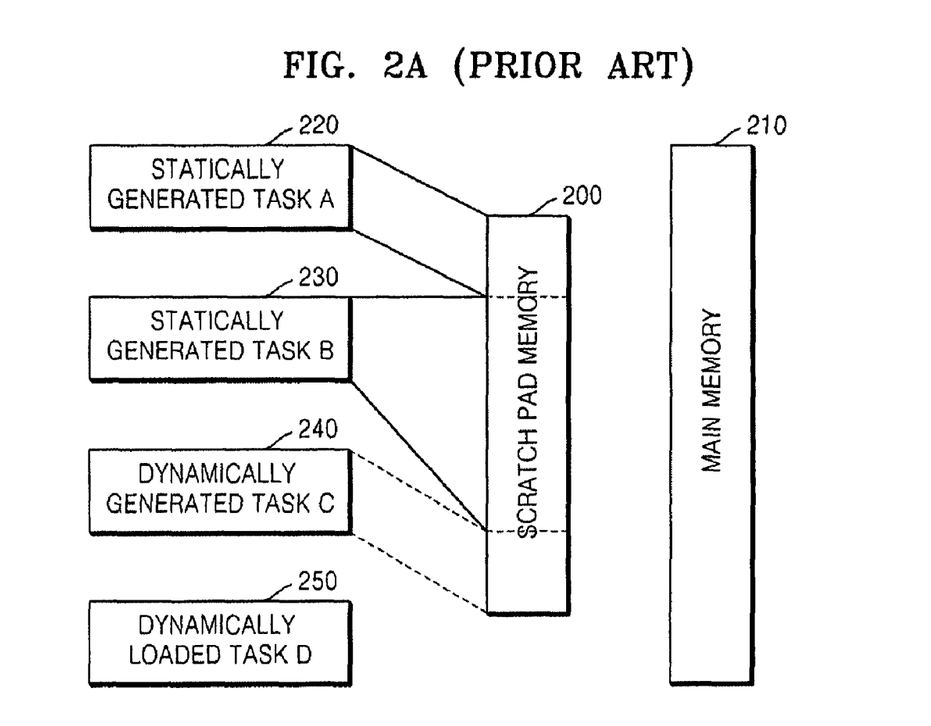
FIGS. 2A through 2C are diagrams for illustrating various conventional methods of allocating scratch pad memory in the MPSoC illustrated in FIG. 1.
Figure 2B:
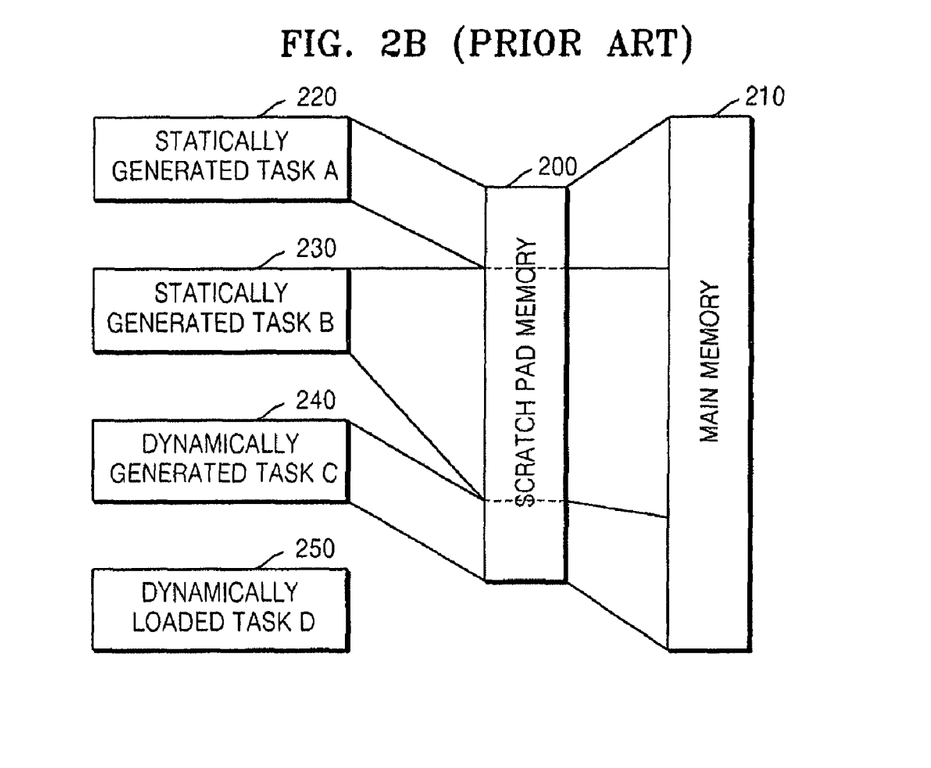
Figure 2C:
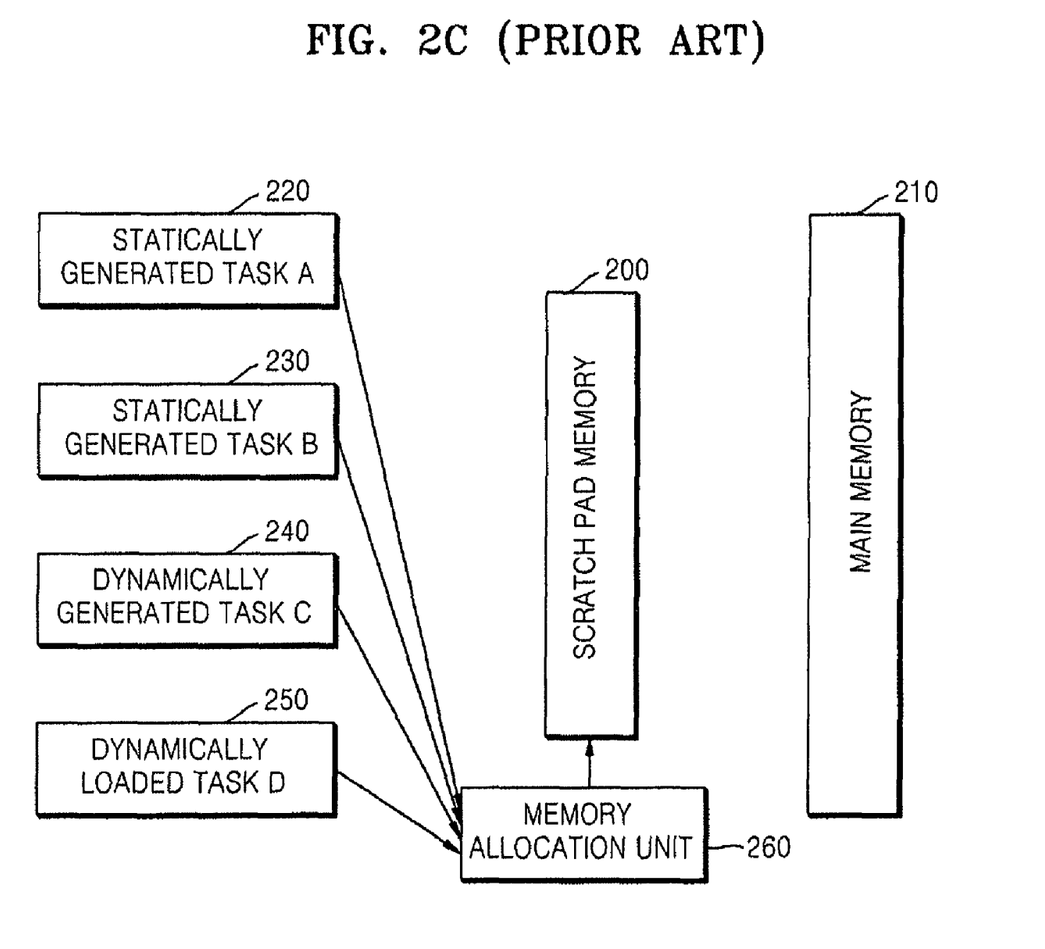

FIGS. 2A through 2C are diagrams for illustrating various conventional methods of allocating a scratch pad memory 200 in the MPSoC illustrated in FIG. 1.

Referring to FIGS. 2A through 2C, the scratch pad memory 200, a main memory 210 and a plurality of tasks A through D 220, 230, 240 and 250 are illustrated.

The scratch pad memory 200 is a high-speed SRAM managed by software, for example, an application or a compiler. The scratch pad memory 200 is used in order to optimize access of data and instruction code.

In general, the scratch pad memory 200 is data memory included in an on-chip, and address space of the scratch pad memory 200 is separated from the address space of off-chip memory but the scratch pad memory 200 and the off-chip memory have the same address and are connected to each other by a data bus.

Data stored in the scratch pad memory 200 can be accessed promptly. However, data stored in the off-chip memory requires a relatively long time to be accessed.

The main difference between a conventional cache memory and the scratch pad memory 200 is that the scratch pad memory 200 always guarantees a cycle of access time, while a cache memory cannot easily guarantee a short access time due to cache misses. Thus, time-sensitive data in a real-time system is stored in the scratch pad memory 200. Dataflow of the cache memory is controlled by hardware not by an application and the speed of the dataflow depends on how accurately cache lines are formed.

On the other hand, software is used to read data from or write data to the scratch pad memory 200.

The main memory 210 is off-chip memory such as DRAM or synchronous dynamic random access memory (SDRAM). The main memory 210 is used as sub-memory of SRAM including the scratch pad memory 200 in the MPSoC.

The above-described memory structure is formed because memory close to a CPU has low capacity, is operated at high-speed, and has a high cost while memory far from the CPU has high capacity, is operated at low-speed, and has a low cost.

Furthermore, the access time of the scratch pad memory 200 is ten through a thousand times faster than the access time of the main memory 210. Therefore, the performance of the whole system can be improved by fetching data or instruction code from the scratch pad memory 200.

Accordingly, when the CPU fetches data or instruction code from memory, first, the CPU checks if the data or the instruction code exists in the scratch pad memory 200. If the data or the instruction code exists in the scratch pad memory 200, the CPU fetches the data or the instruction code from the scratch pad memory 200. If not, the CPU has to fetch the data or the instruction code from the main memory 210.

The methods illustrated in FIGS. 2A through 2C involve allocating variables or data of each of the tasks A through D 220, 230, 240 and 250 to physical address space of the scratch pad memory 200.

FIG. 2A is a diagram for illustrating a static allocation method of the scratch pad memory 200. The static allocation is performed by allocating variables of the task A 220 which is statically generated, to the scratch pad memory 200 and allocating wider space for the task B 230 which is statically generated and more frequently used than the task A 220.

However, the above-described method cannot reflect locality, cannot be applied to the task C 240 which is dynamically generated or has to always allocate fixed space to be applied to the task C 240, and cannot be applied to the task D 250 which is dynamically loaded.

Here, the locality is a phenomenon that when a user program is executed, all instructions in the program are not used evenly and some instructions are intensively used. The locality is divided into temporal locality and spatial locality. The task C 240 is executed by a user's selection and the task D 250 is executed by loading source code of the application through a network or the like.

FIG. 2B is a diagram for illustrating a dynamic allocation method based on a compiler. The dynamic allocation involves managing the scratch pad memory 200 by swapping out data from the scratch pad memory 200 to the main memory 210 and by swapping in data from the main memory 210 to the scratch pad memory 200.

Details of the dynamic allocation method are disclosed in "Dynamic Allocation for Scratch-Pad Memory Using Compile-Time Decisions" ACM Trans. Embedded Computing Systems, Vol. 5, No. 2, pp 472-511, May 2006 by S. Udayakumaran et al. However, the above-described method fixes memory space for each task so as not to be able to reflect locality, has to always allocate fixed space to be applied to the dynamically generated task C 240, cannot be applied to the scratch pad memory 200 having a large number of dynamically generated tasks, and cannot be applied to the dynamically loaded task D 250.

FIG. 2C is a diagram for illustrating a split management method of the scratch pad memory 200. The split management method is performed based on code inserted by a compiler by profiling. Here, a memory allocation unit 260 allocates the tasks A through D 220, 230, 240 and 250 to the scratch pad memory 200 in accordance with the size of necessary variables or data and a memory access frequency for each of the tasks A through D 220, 230, 240 and 250.

Detail of the split management method is disclosed in "Shared Scratch-Pad Memory Space Management" IEEE ISQED, 2006 by O. Ozturk et al. However, the above-described method cannot be applied widely to various tasks due to its restriction that accessing by using a loop is only allowed. Furthermore, high overhead is incurred.

SUMMARY

Additional aspects and/or advantages will be set forth in part in the description which follows and, in part, will be apparent from the description, or may be learned by practice of the invention.

An aspect of present invention provides an efficient method of managing memory, especially, scratch pad memory, in a multiprocessor system on chip (MPSoC).

Another aspect of the present invention also provides a method of managing memory in an MPSoC, the method capable of effective memory allocation for a dynamically generated task or a dynamically loaded task.

According to an aspect, there is provided a method of managing memory in a multiprocessor system on chip (MPSoC), the method including referring to (reading or checking) a predetermined symbol table and determining a storage location of a variable or a function which corresponds to a symbol based on a memory access frequency of the variable or the function; comparing the determined storage location and a previous storage location in which the variable or the function was lastly stored, and determining whether the determined storage location is different from the previous storage location; and copying the variable or the function stored in the previous storage location to the determined storage location if the determined storage location is different from the previous storage location.

According to another aspect, there is provided a method of managing memory in a multiprocessor system on chip (MPSoC) having a two-or-more-layered memory structure, the method including referring to (reading or checking) a predetermined symbol table and determining a storage location of a variable or a function based on a memory access frequency of a symbol; comparing the determined storage location and a previous storage location in which the variable or the function was lastly stored, and determining whether the determined storage location is different from the previous storage location; and copying the variable or the function stored in the previous storage location to the determined storage location if the determined storage location is different from the previous storage location.

According to another aspect, there is provided a method of managing memory in a multiprocessor system on chip (MPSoC), the method including determining whether a memory region used exclusively for the bottom of a predetermined function exists or not and determining whether the exclusive memory region can be allocated to a first memory or not; if it is determined that the exclusive memory region cannot be allocated to the first memory, comparing a performance gain of a case a predetermined size of a memory region allocated to a second memory is stored in the first memory and a cost for copying and restoring the size of a memory region of the first memory to the second memory; and, if the performance gain is greater than the cost, copying the size of the memory region to the second memory and allocating the size of the memory region to the first memory.

According to another aspect, there is provided a computer readable recording medium having recorded thereon a computer program for executing the method.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 3:
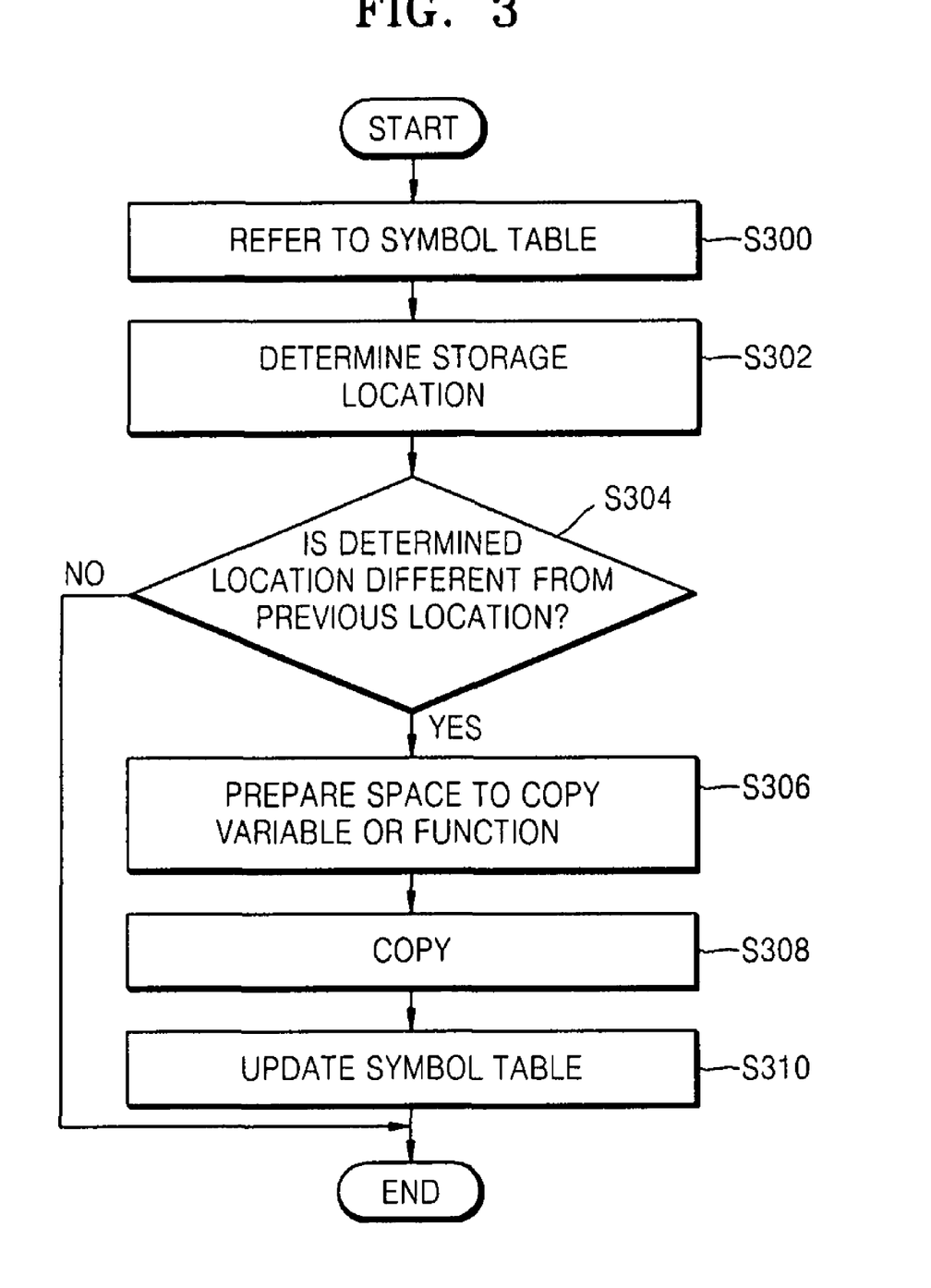
FIG. 3 is a flowchart illustrating a method of managing scratch pad memory in an MPSoC, according to an embodiment of the present invention.

FIG. 3 is a flowchart illustrating a method of managing scratch pad memory in a multiprocessor system on chip (MPSoC), according to an embodiment of the present invention.

In operation 300, a symbol table is referred to. Here, the symbol table is for substituting for a partial region of the scratch pad memory and is provided by a compiler when a variable or a function of a predetermined task is allocated to the scratch pad memory.

The symbol table is composed of a plurality of pairs of {<symbol name>, <address>}. For example, assuming that a pair {6, Ox12345678} has values 'H', 'E', 'L', 'L', 'O', '₩0', 'B', 'Y', 'E', '₩0'of a section of symbol names, text values from a point corresponding to address 5 of the section to a null are BYE so that an address of a symbol BYE is Ox12345678.

In operation 302, a storage location of the variable or the function of the task is determined in consideration of an access frequency of the task. Specifically, it is determined whether the variable or the function of the task is stored into upper memory such as the scratch pad memory or into sub-memory such as dynamic random access memory (DRAM).

Here, the access frequency is a number of times that the task accesses the scratch pad memory. When code is generated to refer to the symbol table in order to calculate a location of the variable or the function, an access frequency of a symbol to be found from the code which refers to the symbol table is updated.

The access frequency of the symbol can be calculated and updated by adding 1 whenever the symbol is accessed and dividing a total frequency number by the time elapsed from a starting point of a system until a point of current time. Alternatively, the last access time of the symbol is selectively recorded and the access frequency may be calculated by using a temporal gap from the last access time until the current access time. For example, if the temporal gap is large, the lastly stored access frequency is greatly lowered. If not, the lastly stored access frequency is less lowered. That is, in the case of a large temporal gap, the access frequency is calculated and updated by multiplying by a number close to 0 between 0 and 1, and in the case of a small temporal gap, by multiplying by a number close to 1 between 0 and 1.

Here, the upper memory such as the scratch pad memory may be a high-speed access memory or a first level memory and the sub-memory such as the DRAM may be a low-speed access memory or a second level memory. Furthermore, a memory level can be extended to two or more levels.

In operation 304, it is determined whether the storage location determined in operation 302 is different from a previous storage location in which the variable or the function of the task was lastly stored. For example, the previous storage location may be the DRAM and the determined storage location may be the scratch pad memory or vice versa.

When it is determined that the determined storage location is different from the previous storage location, in operation 306, space corresponding to the determined storage location to which the variable or the function is to be copied is prepared on the other memory, and in operation 308, the variable or the function is copied to the determined storage location.

Here, the copying involves moving the variable or the function to the determined storage location when the determined storage location is different from the previous storage location. If physical space of the determined storage location is not sufficient, existing memory blocks are evicted.

In the case of a functional code, when the determined storage location is upper memory, for example, when the previous storage location is the DRAM and the determined storage location is the scratch pad memory, the code stored in the previous storage location is copied to the determined storage location and then the code of the previous storage location may or may not be deleted.

On the other hand, when the determined storage location is sub-memory, the code stored in the previous storage location is copied to the determined storage location and then the code of the previous storage location is deleted. After the copying, a relative address used in instruction code, for example, a target address of a branch instruction, has to be changed.

In the case of a variable, data stored in the previous storage location is copied to the determined storage location and then a decision whether to delete the data of the previous storage location or not can be determined in accordance with characteristics of the data, for example, whether the data includes read only data or not. If the variable is a pointer variable, a value of the pointer variable after the data is copied needs to be adjusted as much as a gap between addresses of the new and previous storage locations.

In operation 310, the symbol table which is previously referred to is updated. An address of the previous symbol is updated to a new address of the determined storage location.

Figure 4:
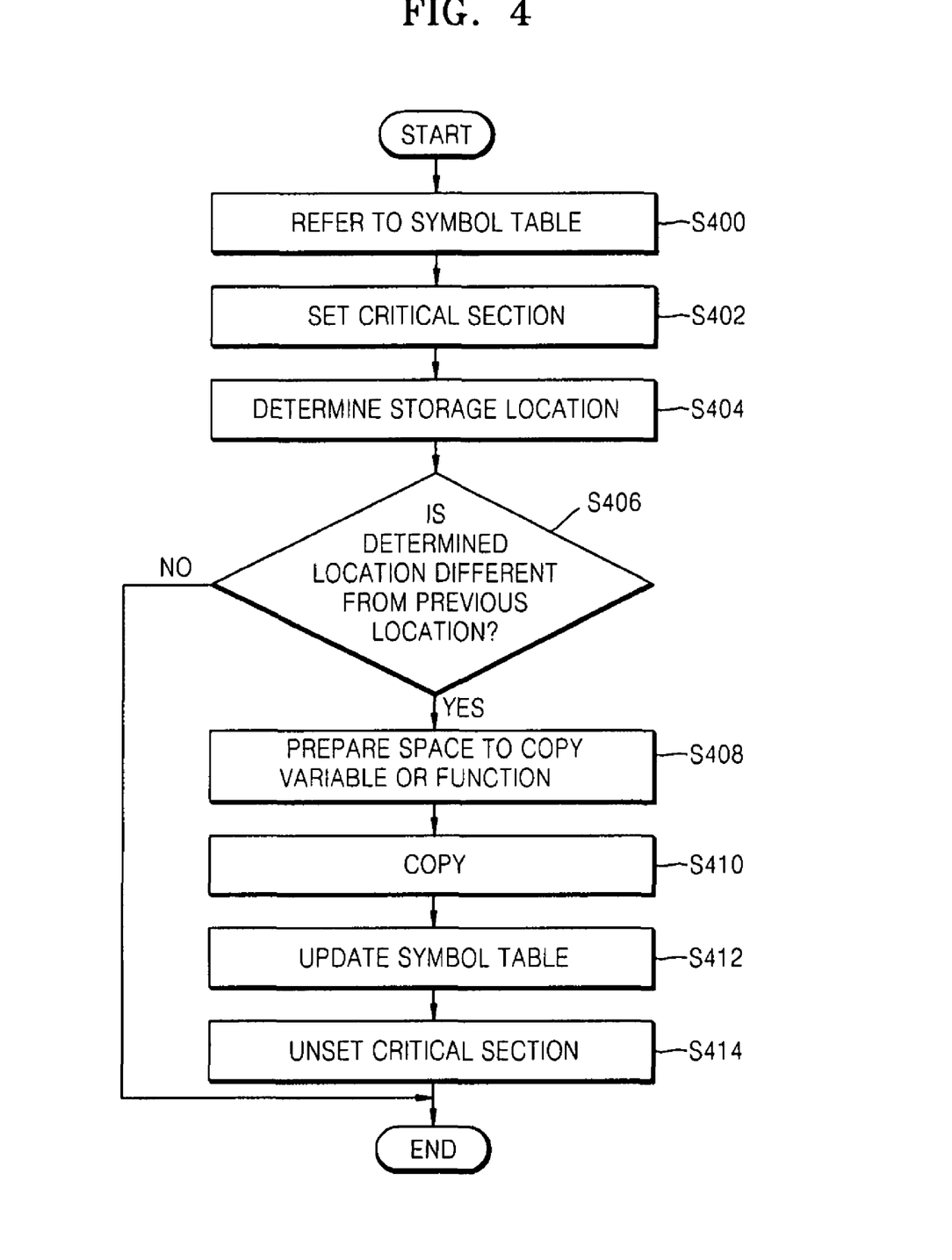
FIG. 4 is a flowchart illustrating a method of managing scratch pad memory in an MPSoC, according to another embodiment of the present invention.

FIG. 4 is a flowchart illustrating a method of managing scratch pad memory in an MPSoC, according to another embodiment of the present invention.

Referring to FIG. 4, in comparison with the flowchart illustrated in FIG. 3, routines of setting and unsetting a critical section are additionally included. Here, assuming that a data region commonly accessed by one or more tasks is a common region, the critical section is a routine to access the common region.

In operation 400, a symbol table is referred to.

In operation 402, the critical section is set. The critical section is set in order to keep consistency of common data which is memory manager metadata such as the symbol table, an access frequency, a previous storage location, and a determined storage location.

When setting the critical section, for example, interference between codes can be prevented by turning an interrupt or a scheduler off. Also, the critical section can be set by using a mutex or a semaphore.

In operation 404, a storage location of a variable or a function of a predetermined task is determined in consideration of an access frequency of the task. Specifically, it is determined whether the variable or the function of the task is stored into upper memory such as scratch pad memory or into sub-memory such as DRAM.

In operation 406, it is determined whether the storage location determined in operation 404 is different from a previous storage location in which the variable or the function of the task was lastly stored.

When it is determined that the determined storage location is different from the previous storage location, in operation 408, space corresponding to the determined storage location to which the variable or the function is to be copied is prepared on the other memory, and in operation 410, the variable or the function is copied to the determined storage location.

In operation 412, the symbol table which is previously referred to is updated. An address of the previous symbol is updated to a new address of the determined storage location. Lastly, in operation 414, the critical section is unset.

Figure 5:
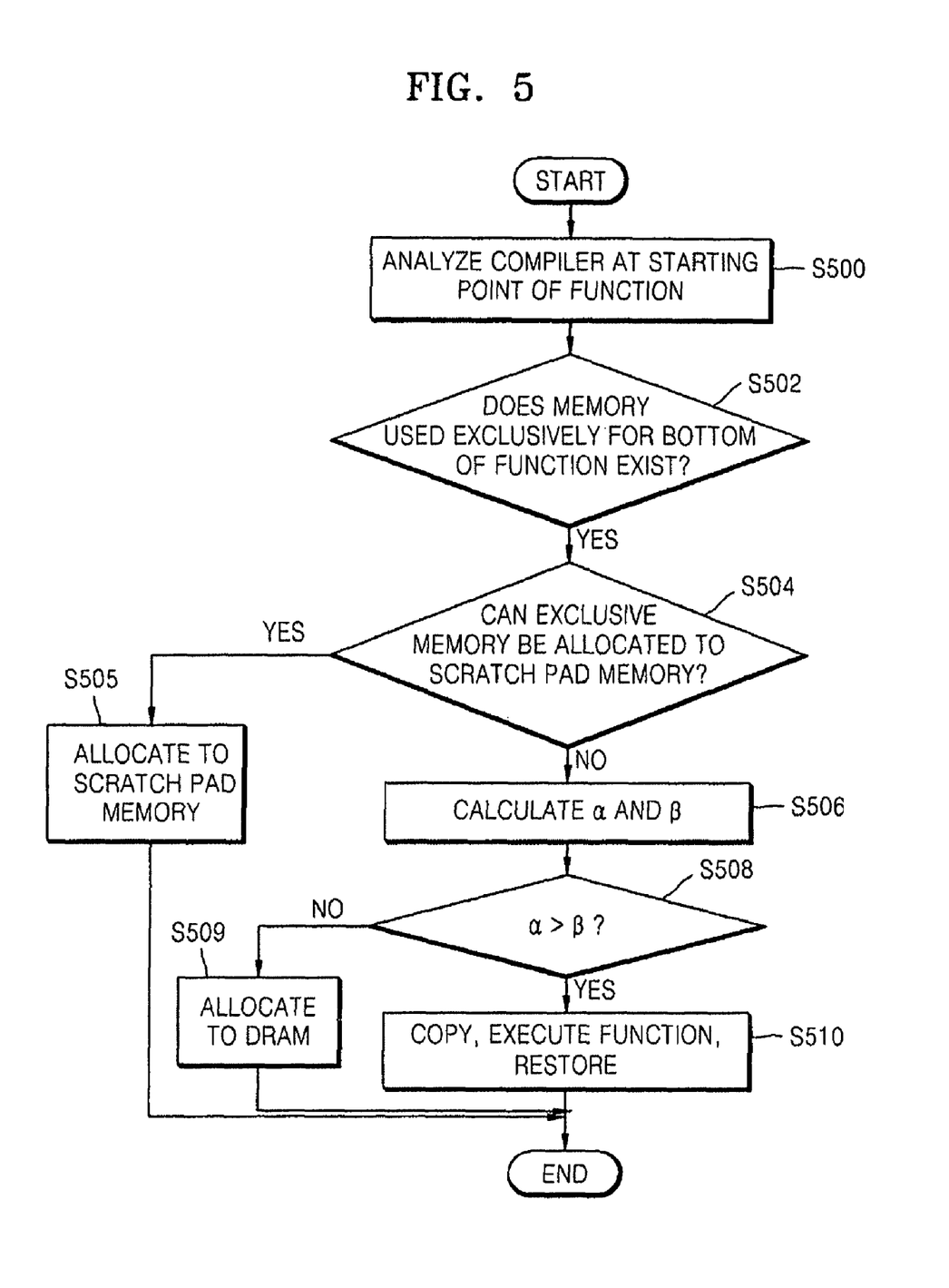
FIG. 5 is a flowchart illustrating a method of managing scratch pad memory in an MPSoC, according to another embodiment of the present invention.

FIG. 5 is a flowchart illustrating a method of managing scratch pad memory in an MPSoC, according to another embodiment.

In operation 500, a compiler analysis is performed at a starting point of a function. By a compiler, for example, a control flow analysis can be performed.

In operation 502, it is determined whether a memory region used exclusively for the bottom of the function exists by using the compiler analysis. The exclusive memory region includes a text region in which actual code of a program is stored, a data region in which data such as a global variable is stored, a stack region in which a local variable, information on a functional call, and temporary data are stored, and a heap region which is used for dynamic memory allocation.

According to an aspect, the exclusive memory region may include the stack region or the heap region.

The stack region in which a local variable, information on a functional call, and temporary data are stored stores a request which has to be processed in a memory block by an allocated variable. When a new request is input, the previous request is put down.

The heap region which is used for dynamic memory allocation is reserved in advance so as to be used by a process of a program in order to store a variable amount of data, the amount not to be fixed until the program is executed.

By the result of the determination in operation 502, if the exclusive memory region exists, in operation 504, it is determined whether the exclusive memory region can be allocated to the scratch pad memory. That is, a decision whether to allocate the exclusive memory region to the scratch pad memory is made.

The decision is made in consideration of available space of the scratch pad memory and the size of the exclusive memory region.

For example, the available space of the scratch pad memory should be greater than the size of the exclusive memory region. Also, when the function is called, if the function is not a leaf function which does not call another function, the available space of the scratch pad memory should be greater than total space which has to be used for the function and its child function, which is called before memory used for the function becomes null.

In accordance with the result of the determination in operation 504, if the available space of the scratch pad memory is greater than the size of the exclusive memory region, in operation 505, the stack region or the heap region is allocated to the scratch pad memory.

In accordance with the result of the determination in operation 504, if the available space of the scratch pad memory is less than the size of the exclusive memory region, in operation 506, values of $\alpha$ and $\beta$ are calculated.

Here, $\alpha$ is a performance gain when a predetermined size S of memory allocated to the DRAM is stored into the scratch pad memory. The predetermined size S can be calculated using Equation 1 below.

$$S = \min(S1, S2), \quad \text{[Equation 1]}$$

where S1 is the size of a memory region allocated to the DRAM and S2 is the size of a stack being used.

Also, the performance gain can be obtained by multiplying a memory access frequency by a performance gap. The performance gap is access time of the DRAM subtracted by access time of the scratch pad memory.

$\beta$ is a cost for copying and restoring the size S of the stack being used to the DRAM. Here, the size S is calculated using Equation 1, and the cost includes system resources and time used for the memory copying.

In operation 508, $\alpha$ and $\beta$ calculated in operation 506 are compared to each other. If $\alpha$ is less then $\beta$, in operation 509, the exclusive memory region is allocated to the DRAM.

If $\alpha$ is greater then $\beta$, in operation 510, the exclusive memory region is allocated to the DRAM. The bottom size S of the stack, that is, an unused size of the function of the stack, is memory copied. In other words, the function is executed by allocating the size S of memory to be allocated to the DRAM to the scratch pad memory and the copied stack is restored before the function returns to another function which uses the copied stack.

Figure 6:
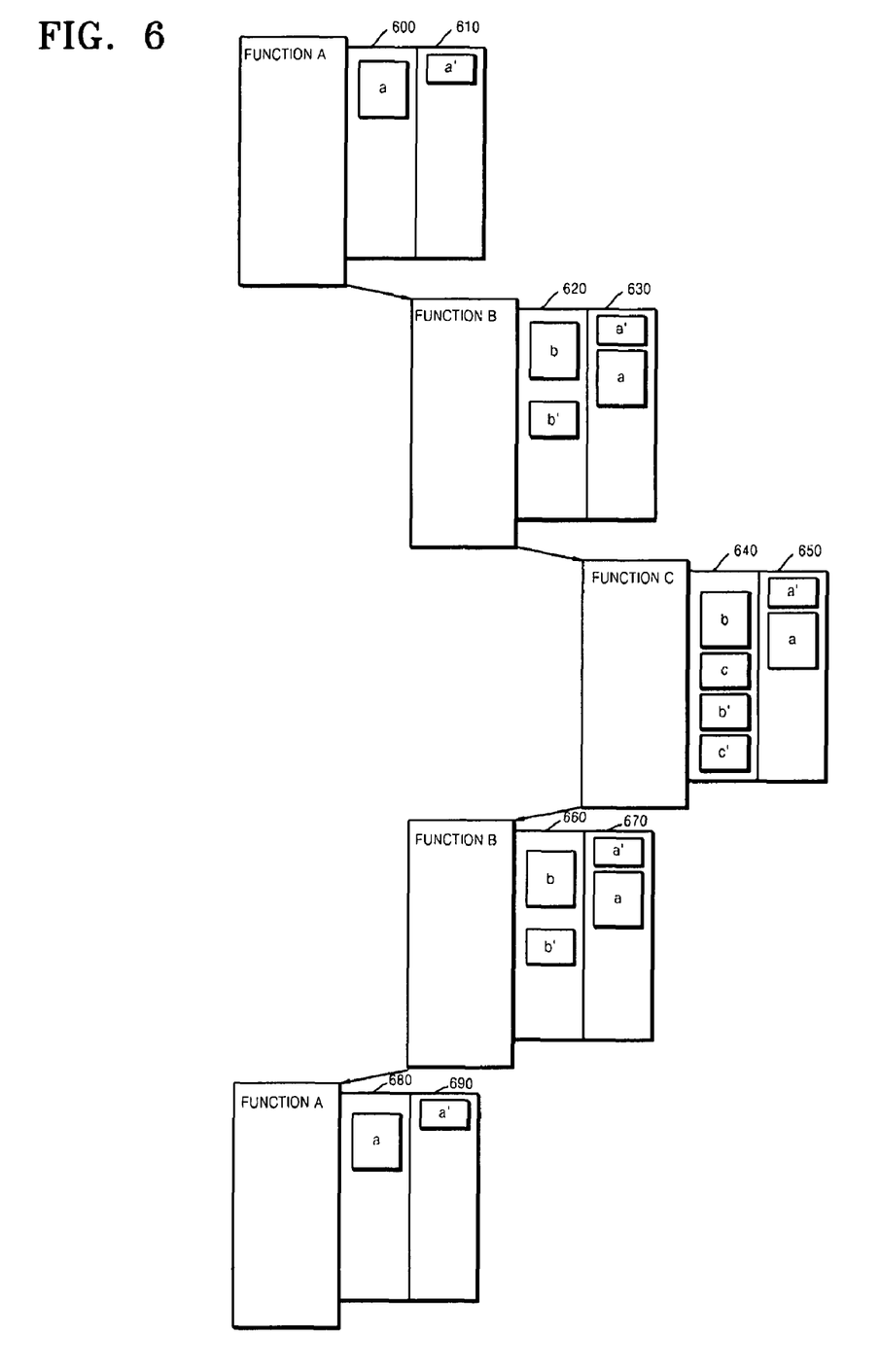
FIG. 6 is a diagram illustrating the copying and restoring processes of the method illustrated in FIG. 5, according to an embodiment of the present invention.

FIG. 6 is a diagram illustrating the copying and restoring processes of the method illustrated in FIG. 5, according to an embodiment.

Referring to FIG. 6, it is assumed that function A, function B, function C, function B and function A are executed in the above-mentioned order. Variations of stack regions a through c and heap regions a' through c' stored in upper memory such as scratch pad memories 600, 620, 640, 660 and 680, that is, copying and restoring to sub-memories such as DRAM 610, 630, 650, 670 and 690 will be described.

First, when executing function A, it is determined whether a memory region such as the stack region a or the heap region a' used exclusively for the bottom of function A exists by including an additional search routine to an end of function A.

If the stack region a or the heap region a' exists, it is determined whether the stack region a or the heap region a' can be allocated to the scratch pad memory 600.

Here, when determining whether the stack region a or the heap region a' can be allocated to the scratch pad memory 600 or not, values of $\alpha$ and $\beta$ are calculated in accordance with the result of the determination in operation 504 illustrated in FIG. 5 and if $\alpha$ is greater then $\beta$, the stack region a is copied to the DRAM 630.

The stack region b and the heap region b' of function B are stored in the scratch pad memory 620 and the heap region a' of function A and the copied stack region a are stored in the DRAM 630. In FIG. 6, the heap region b' of function B is stored in the scratch pad memory 620. However, it is obvious that the heap region b' of function B can be stored in the DRAM 630.

When function C is executed, the stack region b and the heap region b' of function B and the stack region c and the heap region c' of function C are stored in the scratch pad memory 640, and the stack region a and the heap region a' of function A are stored in the DRAM 650. Here, in FIG. 6, when function C is executed, the stack region b and the heap region b' of function B are stored in the scratch pad memory 640; however, it is obvious that the stack region b and the heap region b' of function B can be deleted.

Returning to function B, the stack region c and the heap region c' of function C are deleted. Also, a routine of restoring the stack region a of function A is included to an end of function B.

Returning to function A, the stack region b and the heap region b' of function B are deleted from the scratch pad memory 680 and the stack region a of function A is restored from the DRAM 690 to the scratch pad memory 680.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, according to the present invention, locality of memory can be reflected and restricted memory resources can be efficiently used by determining a storage location of a variable or a function which corresponds to a symbol with reference to a symbol table based on a memory access frequency of the variable or the function, comparing the determined storage location and a previous storage location of the variable or function, and copying the variable or the function stored in the previous storage location to the determined storage location if the determined storage location is different from the previous storage location.

Furthermore, an embodiment of the present invention can be applied to a dynamically generated task or to a dynamically loaded task and be applied widely to various other tasks.

While an embodiment of the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of managing memory in a multiprocessor system on chip (MPSoC), the method comprising:
    referring to (reading or checking) a predetermined symbol table and determining a storage location of a variable or a function which corresponds to a symbol based on a memory access frequency of the variable or the function;
    comparing the determined storage location and a previous storage location in which the variable or the function was lastly stored, and determining whether the determined storage location is different from the previous storage location; and
    copying the variable or the function stored in the previous storage location to the determined storage location if the determined storage location is different from the previous storage location.

2. The method of claim 1, wherein the determined storage location and the previous storage location is a first memory included in the MPSoC and a second memory outside the MPSoC, respectively, or the second memory outside the MPSoC and the first memory included in the MPSoC, respectively.

3. The method of claim 2, wherein the determining further comprises arranging a plurality of variables or functions in order of high access frequency and storing the variables or the functions in the first memory in the above order.

4. The method of claim 1, wherein the copying the variable or the function further comprises preparing space corresponding to the determined storage location to which the variable or the function is to be copied and, if storage space of the determined storage location is not sufficient, evicting existing memory blocks.

5. The method of claim 1, wherein determining a storage location of a variable or a function further comprises updating the memory access frequency of the variable or the function, wherein the updating of the memory access frequency comprises updating the memory access frequency according to the number of times that the variable or the function accesses the memory or according to the access time of the variable or the function.

6. The method of claim 1, further comprising updating the symbol table based on the location of the copied variable or function.

7. The method of claim 1, further comprising setting a critical section, wherein the critical section maintains data any one of the symbol table, the memory access frequency, the previous storage location, and the determined storage location or combinations thereof.

8. The method of claim 7, wherein the setting critical section is set by a mutex or a semaphore.

9. The method of claim 7, wherein the setting critical section further comprises turning an interrupt or a schedule off to prevent interference between codes.

10. The method of claim 2, wherein the first memory is a scratch pad memory.

11. The method of claim 10, wherein the scratch pad memory is a high speed SRAM (Static Random Access Memory).

12. The method claim 2, wherein the second memory is a DRAM (Dynamic Random Access Memory).

13. A non-transitory computer readable recording medium having recorded thereon a computer program for executing the method of claim 1.

14. A method of managing memory in a multiprocessor system on chip (MPSoC) having two or more layered memory structure, the method comprising:
    referring to (reading or checking) a predetermined symbol table and determining a storage location of a variable or a function based on a memory access frequency of a symbol;
    comparing the determined storage location and a previous storage location in which the variable or the function was lastly stored, and determining whether the determined storage location is different from the previous storage location; and
    copying the variable or the function stored in the previous storage location to the determined storage location if the determined storage location is different from the previous storage location.

* * * * *